(12) United States Patent
Ben-Yehuda et al.

(10) Patent No.: US 11,513,729 B1
(45) Date of Patent: Nov. 29, 2022

(54) DISTRIBUTED WRITE BUFFER FOR STORAGE SYSTEMS

(71) Applicant: Lightbits Labs Ltd., Kfar Saba (IL)

(72) Inventors: Shmuel Ben-Yehuda, Haifa (IL); Ofir Efrati, Even Yehuda (IL); Abel Alkon Gordon, Haifa (IL); Ofer Hayut, Rosh Pina (IL); Eran Kirzner, Moshav Elishama (IL); Alexander Shpiner, Nesher (IL); Roy Shterman, Kfar Saba (IL); Maor Vanmak, Magal (IL)

(73) Assignee: Lightbits Labs Ltd., Kfar Saba (IL)

( * ) Notice: Subject to any disclaimer, the term of this patent is extended or adjusted under 35 U.S.C. 154(b) by 0 days.

(21) Appl. No.: 17/373,907

(22) Filed: Jul. 13, 2021

Related U.S. Application Data

(60) Provisional application No. 63/050,954, filed on Jul. 13, 2020.

(51) Int. Cl.
*G06F 3/06* (2006.01)
(52) U.S. Cl.
CPC .......... *G06F 3/0656* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 6,802,022 B1* | 10/2004 | Olson | G06F 11/1435 |
| | | | 714/E11.138 |
| 2002/0103814 A1* | 8/2002 | Duvillier | G06F 16/24 |
| 2021/0326216 A1* | 10/2021 | Subramanian | G06F 3/0619 |

* cited by examiner

*Primary Examiner* — Brian R Peugh
(74) *Attorney, Agent, or Firm* — Pearl Cohen Zedek Latzer Baratz LLP

(57) ABSTRACT

A computer-based system and method for providing a distributed write buffer in a storage system, including: obtaining a write request at a primary storage server to store data associated with the write request in a non-volatile storage of the primary storage server; and storing the data associated with the write request in a persistent memory of the primary storage server or in a persistent memory of an auxiliary storage server based on presence of persistent memory space in the primary storage server. The write request may be acknowledged by the primary storage server after storing the data associated with the write request in the persistent memory of the primary storage server or in the persistent memory of the auxiliary storage server.

15 Claims, 11 Drawing Sheets

DISTRIBUTED WRITE BUFFER FOR STORAGE SYSTEMS

CROSS-REFERENCE TO RELATED APPLICATIONS

This application claims the benefit of provisional U.S. Patent Application No. 63/050,954, filed Jul. 13, 2020 and entitled: "A DISTRIBUTED WRITE BUFFER FOR STORAGE SYSTEMS WITH SYNCHRONOUS REPLICATION", which is hereby incorporated by reference in its entirety.

FIELD OF THE INVENTION

The present invention relates generally to storage systems. More specifically, the present invention relates to storage systems with persistent memory.

BACKGROUND

A storage system or storage environment may include several storage servers, that may also be referred to as storage controllers. Multiple storage servers working in collaboration may form a storage cluster. In a storage cluster, a user, commonly referred to as a host or a client, may access data by accessing a subset of the storage servers in the cluster that hold the data.

One technique that storage clusters may use for increasing data protection and availability is referred to in the art as synchronous replication of user writes. A synchronous replication relation may be established between different storage servers in the cluster, with a selected storage server in the cluster referred to as a primary storage server and a subset of the other storage servers referred to as secondary storage servers. The set of storage servers which hold replicas of a certain unit of data may be referred to as a "replica set" for that unit of data. A replica set may typically have a single primary storage server and may have a number of secondary storage server at any given point in time.

The primary storage server may receive a write request from a user and issue a replication request to one or more secondary storage servers, asking them to replicate, e.g., store copies of, the user data. To protect the user data from server failure, the primary controller may only acknowledge the write to the user after all the secondary storage servers have acknowledged the replication request to the primary controller, e.g., the data has been stored on each storage server in the replica set.

SUMMARY

According to embodiments of the invention, a system and method for providing a distributed write buffer may include obtaining a write request at a primary storage server to store data associated with the write request in a non-volatile storage of the primary storage server; and storing the data associated with the write request in a persistent memory of the primary storage server or in a persistent memory of an auxiliary storage server based on presence of persistent memory space in the primary storage server.

Embodiments of the invention may include acknowledging, by the primary storage server, the write request after storing the data associated with the write request in the persistent memory of the primary storage server or in the persistent memory of the auxiliary storage server.

Embodiments of the invention may include storing, by the primary storage server, the data associated with the write request in the non-volatile storage of the primary storage server.

Embodiments of the invention may include erasing, by the primary storage server, the data associated with the write request from the persistent memory of the auxiliary storage server after storing the data associated with the write request in the non-volatile storage of the primary storage server.

Embodiments of the invention may include issuing, by the primary storage server, a replication request to a secondary storage server; and storing the data associated with the write request in a persistent memory of the secondary storage server or in a persistent memory of a third storage server based on presence of persistent memory space in the secondary storage server.

Embodiments of the invention may include acknowledging the replication request by the secondary storage server to the primary storage server after storing the data associated with the write request in the persistent memory of the third storage server; and acknowledging the write request by the primary storage server after receiving the acknowledgement from the secondary storage server, and after storing the data associated with the write request in the persistent memory of the auxiliary storage server.

Embodiments of the invention may include issuing, by the primary storage server, a plurality of replication requests to a plurality of secondary storage servers; and storing, by each of the secondary storage servers, the data associated with the write request in a persistent memory of the secondary storage server or in a persistent memory of a unique third storage server of a plurality of third storage servers, based on presence of persistent memory space in the secondary storage server.

Embodiments of the invention may include acknowledging the replication request by each of the secondary storage servers to the primary storage server after storing the data associated with the write request in the respective persistent memory of the respective unique auxiliary storage server; and acknowledging the write request by the primary storage server after receiving the acknowledgements from each of the secondary storage servers, and after storing the data associated with the write request in the persistent memory of the third storage server.

According to embodiments of the invention, the access time of the persistent memory may be faster than the access time of the non-volatile storage by at least an order of magnitude.

According to embodiments of the invention, storing the data associated with the write request in a persistent memory of the auxiliary storage server may include: sending, by the primary storage server, the data associated with the write request to the auxiliary storage server; and storing, by the auxiliary storage server, the data associated with the write request in the persistent memory of the auxiliary storage server.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
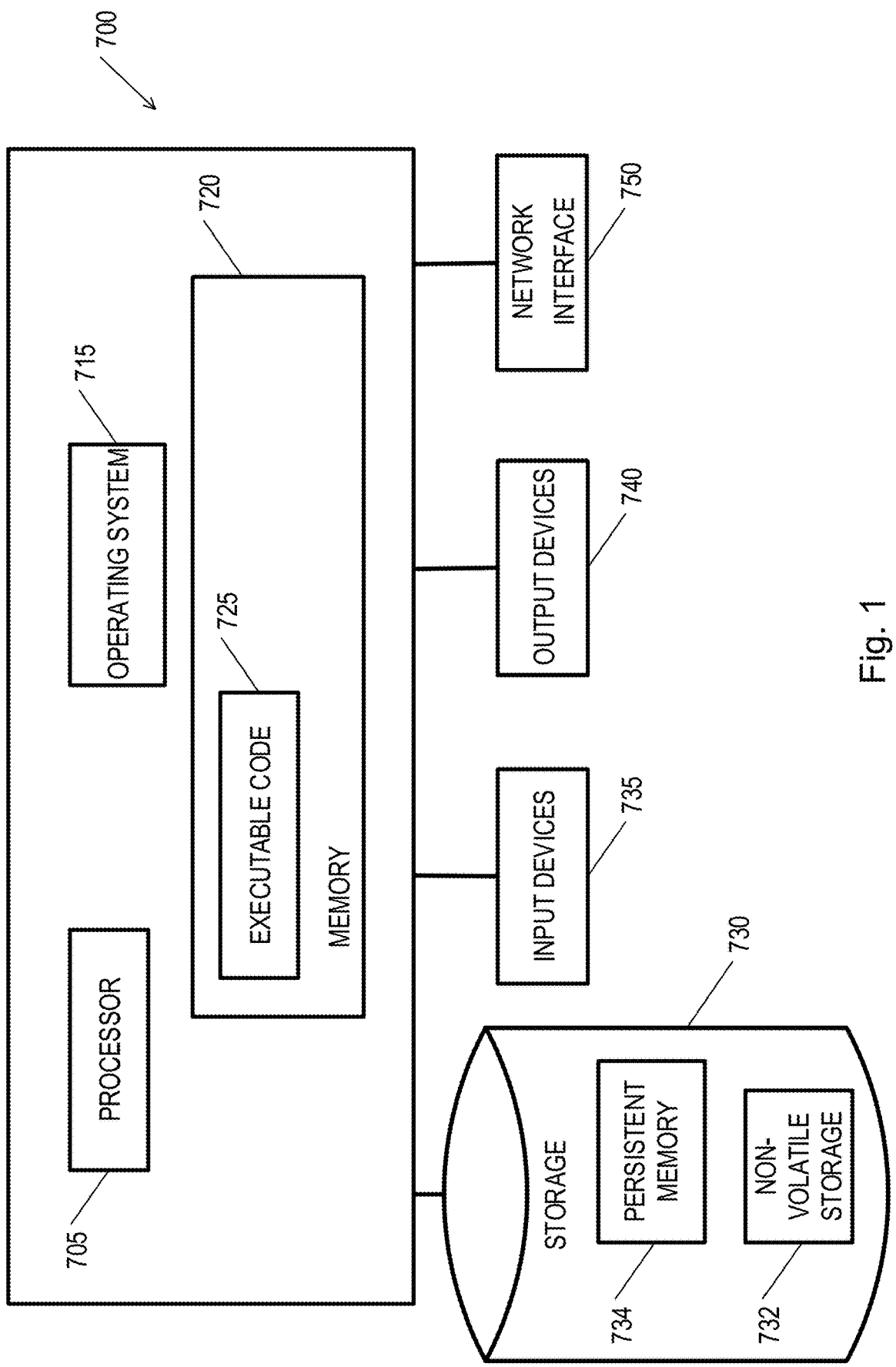
FIG. 1 is a schematic illustration of a storage system, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining", "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

A storage cluster may include a plurality of storage servers, where all storage servers manage data storage on non-volatile storage media, and some storage servers, but not necessarily all, include a persistent memory (PMEM) component such as a high-density persistent memory component. The term persistent memory component, or simply persistent memory, may be used herein to refer to a memory device, module or unit, connected to the memory bus that is persistent, e.g., a non-volatile storage component, and that can be addressed on a byte granularity using load/store instructions. Typically, the write latencies of the persistent memory component are much lower than the write latencies of the non-volatile storage media, e.g., at least by an order of magnitude. For example, read and write latencies of the persistent memory component may be as low as 5-10 microseconds, while read and write latencies of non-volatile storage media, implemented for example using NAND flash-based storage, may be about 100-200 microseconds.

According to some embodiments, part of the persistent memory space may be set aside, to implement a write cache, also referred to as a write buffer. The write cache may be used to store user data before the user data is stored in the non-volatile storage media. It may be appreciated by a person skilled in the art that storing data in the write buffer, implemented by a fast persistent memory, is much faster than storing the same data on the non-volatile storage media.

Thus, when a storage server receives a write request from a user or a host, the storage server may store the incoming data in the write buffer of the storage server, referred to as a local write buffer, and acknowledge the replication request to the user or host before writing the data to the non-volatile storage media, referred to as a local non-volatile storage media, thus avoiding the delay required by writing the data to the slow local non-volatile storage media before acknowledging the write operation.

As used herein, a storage server may be referred to as having available persistent memory when the storage server includes a local persistent memory, and the local persistent memory has enough free space to store the data included in the write request. Similarly, a storage server may be referred to as not having available persistent memory when the storage server does not include a local persistent memory, or when the storage server includes a local persistent memory, but the local persistent memory does not have enough free space to store the data included in the write request.

According to embodiments of the invention, in cases where the storage server receives a write request, and does not have available persistent memory the storage server may send the replication request to a second storage server, referred to herein as an auxiliary storage server, which does have space in its write buffer. The auxiliary storage server may store the data included in or associated with the write request (also referred to herein as the user data) in its write buffer, and acknowledge the write request back to first storage server. The first storage server may in turn acknowledge the write request back to the host. The first storage server may be configured to read the data back from the auxiliary storage server when storage space becomes available in the write buffer of the first storage server and/or when the first storage server is ready to store the data included in the write operation in its local non-volatile storage media.

Embodiments of the invention may be utilized to implement fast replica sets in storage clusters. In a replica set, a primary storage server may receive a write request from a user and issue a replication request to one or more secondary storage servers, asking them to replicate, e.g., store copies of, the user data. The primary storage server may only acknowledge the write request to the host after all of the secondary storage servers have acknowledged the replication request to the primary storage server, e.g., the data has been stored on each server in the replica set. According to embodiments of the invention, each of the secondary storage servers may store the data of the write request in its local write buffer. However, in case where a secondary storage server does not have a local write buffer, or the local write buffer of the secondary storage server is full, the secondary storage server may store the data of the write request in a persistent memory of an auxiliary storage server, as disclosed herein. Thus, each of the primary and secondary storage servers in a replica set may acknowledge the write request after storing the data in a persistent memory, being their local persistent memory or a persistent memory of an auxiliary storage server. As a result, the entire latency of the write request may be reduced comparing to acknowledging the write request only after storing the data in the non-volatile storage media.

Thus, embodiments of the invention may provide a distributed write buffer in a storage cluster, and may enable fast acknowledge of write operations, even in cases where some storage servers do not have a local write buffer, or when a storage server do have a local write buffer, but the local write buffer is full. Therefore, embodiments of the invention may improve the technology of storage servers, by reducing latencies of write requests.

Some embodiments of the invention may be used as block storage devices. Additionally or alternatively, embodiments of the invention, while implemented as block storage device, may be used to emulate objects storage as well.

FIG. 1 is a schematic illustration of a storage server, according to an embodiment of the invention. Storage server 700 may include a processor 705 that may be, for example, a central processing unit processor (CPU), a chip or any suitable computing or computational device, an operating system 715, a memory 720, storage 730, input devices 735 and output devices 740. Processor 705 may be or include one or more processors, etc., co-located or distributed. Storage server 700 may be or may include for example a workstation or personal computer, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of storage server 700, for example. Operating system 715 may be a commercial operating system. Operating system 715 may be or may include any code segment designed and/or configured to provide a virtual machine, e.g., an emulation of a computer system. Memory 720 may be or may include, for example, a random-access memory (RAM), a read only memory (ROM), a dynamic RAM (DRAM), a synchronous DRAM (SD-RAM), a double data rate (DDR) memory chip, a Flash memory, a volatile memory, a non-volatile storage, a cache memory, a buffer, a short-term memory unit, a long-term memory unit, or other suitable memory units or storage units. Memory 720 may be or may include a plurality of possibly different memory units.

Executable code 725 may be any executable code, e.g., an application, a program, a process, task or script. Executable code 725 may be executed by processor 705 possibly under control of operating system 715. For example, executable code 725 may be or include software for managing storage 730, according to embodiments of the invention.

Storage 730 may be or may include, for example, a hard disk drive, a non-volatile storage, a flash memory, a floppy disk drive, a Compact Disk (CD) drive, a CD-Recordable (CD-R) drive, a universal serial bus (USB) device or other suitable removable and/or fixed storage unit. Storage 730 may include one or more types of non-volatile block storage devices that may form a non-volatile storage 732 and a persistent memory component 734. For example, the latency of the block storage devices included in non-volatile storage 732 may be higher than the latency of the block storage devices included in persistent memory 734. For example, the write latencies of the block storage devices included in non-volatile storage 732 may be below 30 microseconds e.g., as low as 5 microseconds, and a write latency of block storage devices included in non-volatile storage 732 may be about 100-200 microseconds or even higher. In some implementations, persistent memory 734 may include non-volatile dual in-line memory module (NVDIMM), non-volatile random-access memory (NVRAM), 3DXpoint storage devices (e.g., Optane®), etc., and non-volatile storage 732 may include NAND flash-based storage. NAND flash-based storage may include any combination of single level cells (SLC) that allow storage of a single data bit per memory cell, multiple level cells (MLC) that allow storage of two data bits per each memory cell, triple level cells (TLC), quadruple level cells (QLC) and penta-level cells (PLC) that allow storage of three, four and five bits per memory cell respectively, hard disk drive (HDD), etc. Other devices, technologies and latencies may be used.

In some embodiments, some of the components shown in FIG. 1 may be omitted. For example, memory 720 may be a non-volatile storage having the storage capacity of storage 730. Accordingly, although shown as a separate component, storage 730 may include memory 720.

Input devices 735 may be or may include a mouse, a keyboard, a touch screen or pad or any suitable input device. It will be recognized that any suitable number of input devices may be operatively connected to storage system 700 as shown by block 735. Output devices 740 may include one or more displays, speakers and/or any other suitable output devices. It will be recognized that any suitable number of output devices may be operatively connected to storage server 700 as shown by block 740. Any applicable input/output (I/O) devices may be connected to storage server 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable storage server 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

Figure 2:
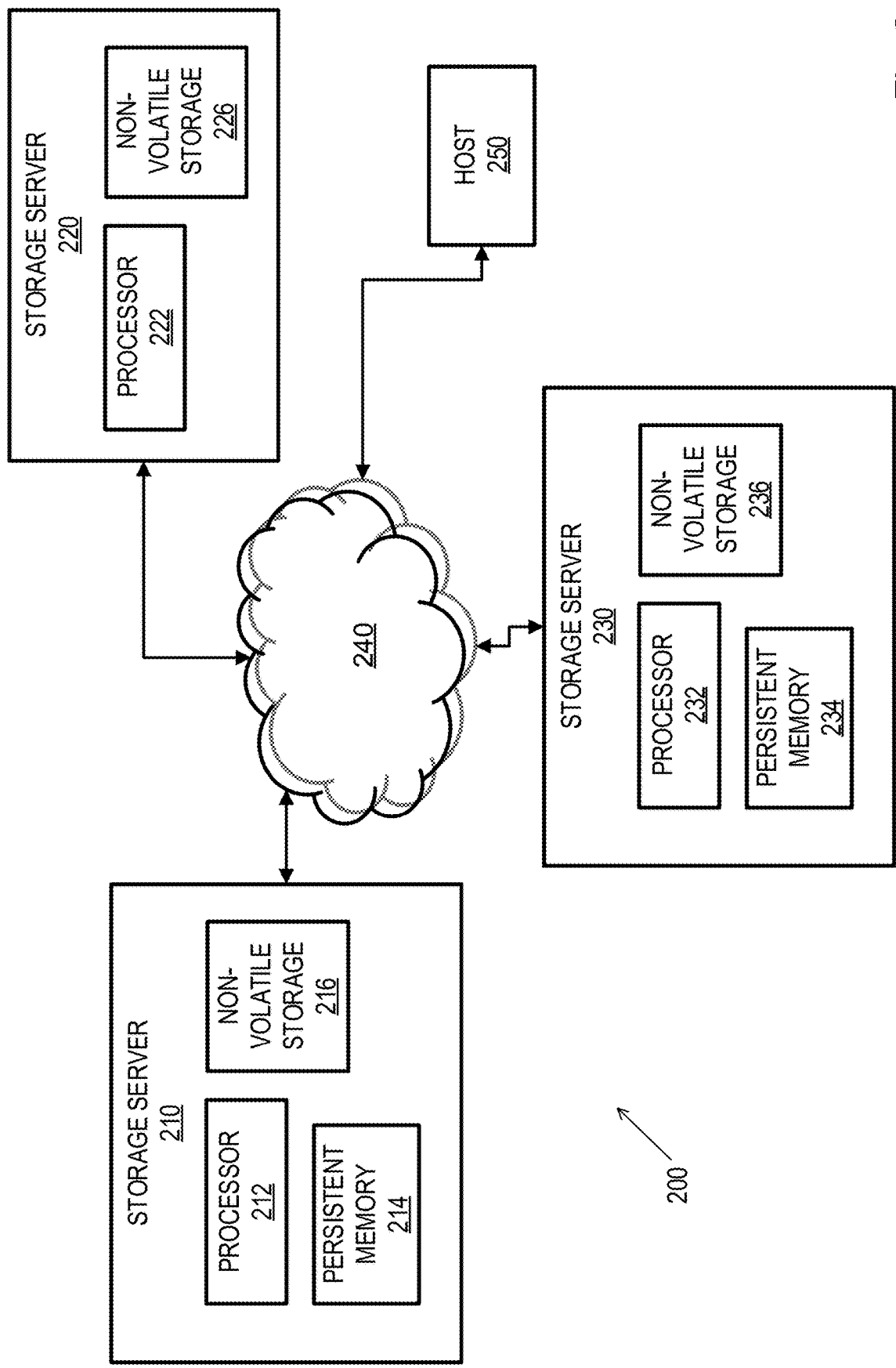
FIG. 2 is a schematic illustration of a storage cluster, according to embodiments of the invention.

Reference is now made to FIG. 2, which is a schematic illustration of a storage cluster 200, according to embodiments of the invention. Storage cluster 200 may include a plurality of storage servers 210, 220 and 230. Storage servers 210, 220 and 230 may be similar to storage server 700 depicted in FIG. 1. However, some of the storage servers, e.g., storage servers 210 and 230, may include a persistent memory module 214 and 236, respectively, for implementing a write buffer, while other storage servers, e.g., storage server 220 may not include a persistent memory module.

According to embodiments of the invention, host 250 and storage servers 210, 220 and 230 may be interconnected through network or networks 240. Network 240 may include any type of network or combination of networks available for supporting communication between host 250 and storage servers 210, 220 and 230. Networks 240 may include for example, a wired, wireless, fiber optic, or any other type of connection, a local area network (LAN), a wide area network (WAN), the Internet and intranet networks, etc. some or all of host 250 and storage servers 210, 220 and 230 may be directly connected.

According to embodiments of the invention, client or host 250 may send a write request to one or more storage servers in storage cluster 200. A storage server, e.g., storage server 210, may obtain the write request. While ultimately storage server 210 may store the data included or associated with the write request in the non-volatile storage 216 of storage server 210, storage server 210 may first store the data included or associated with the write request in its persistent memory module 214 (e.g., in a write buffer implemented in persistent memory module 214), acknowledge the write request to host 250 once the data is stored in persistent memory module 214, and concurrently or afterwards store the data in non-volatile storage 216. Thus, host 250 may obtain acknowledgement of the write request very quickly, depending only on latencies of network 240 and persistent memory module 214, and not on latencies of non-volatile storage 216 which may be much higher.

According to embodiments of the invention, persistent memory module 214 may be full, or may not have enough free storage space to store the data included or associated with the write request. According to embodiments of the invention, if persistent memory module 214 is full, or do not have enough free storage space, storage server 210 may forward or send the write request to another storage server, referred herein as an auxiliary storage server, e.g., storage server 230, that includes a persistent memory module 236, and that has enough free storage space to store the data included in the write request. Storage server 230 may store the data included in the write request in its persistent memory module 236 (e.g., in a write buffer implemented in persistent memory module 236) and may acknowledge the write request to storage server 210. Storage server 210 may acknowledge the write request to host 250 upon (e.g., after, right after, shortly after, immediately following) receiving the write acknowledgement from storage server 230. Storage server 210 may store the data included in the write request in its non-volatile storage 216, concurrently or after forwarding the write request to storage server 230, however, this operation may take much longer than storing the data in the persistent memory module 236 of storage server 230.

According to some embodiments, the write request may be obtained by a storage server that does not have a persistent memory module or a write buffer at all, e.g., storage server 220. According to embodiments of the invention, storage server 210 may forward the write request to another storage server, referred herein as an auxiliary storage server, e.g., storage server 230 that includes a persistent memory module 236, and that has enough free storage space to store the data included in the write request. Storage server 230 may store the data included in the write request in its persistent memory module 236 and may acknowledge the write request to storage server 220. Storage server 220 may acknowledge the write request to host 250 upon (e.g., after, right after, shortly after, immediately following) receiving the write acknowledgement from storage server 230. Storage server 220 may store the data included in the write request in its non-volatile storage 216, concurrently or after forwarding the write request to storage server 230, however, this operation may take much longer than storing the data in the persistent memory module 236 of storage server 230.

According to some embodiments, each of storage servers 210, 220 and 230 may be associated with a predefined one or more auxiliary storage servers, e.g., defined during configuration of storage servers 210, 220 and 230. In some embodiments, all storage servers that have a local persistent memory module 216, 236 may be possible auxiliary storage servers to other storage servers 210, 220 and 230. Thus, a storage server, e.g., storage server 210 that obtains a write request, may store the data associated with the write request in its local a persistent memory 216 or in a persistent memory 236 of an auxiliary storage server 230 based on presence of local persistent memory space, e.g., presence of local persistent memory space in the storage server 210 that obtained the write request. According to some embodiments, a storage server 210 that obtains a write request, and needs to store the data included in the write request in an auxiliary storage server 230, may communicate or perform handshake with the auxiliary storage server 230 to verify that the auxiliary storage server 230 has enough free space in its persistent memory 236 to store the data included in the write request. if auxiliary storage server 230 does not have enough free space in its persistent memory 236 to store the data included in the write request, storage server 210 may approach another auxiliary storage server or may store the data directly to its non-volatile storage 216.

Figure 3A:
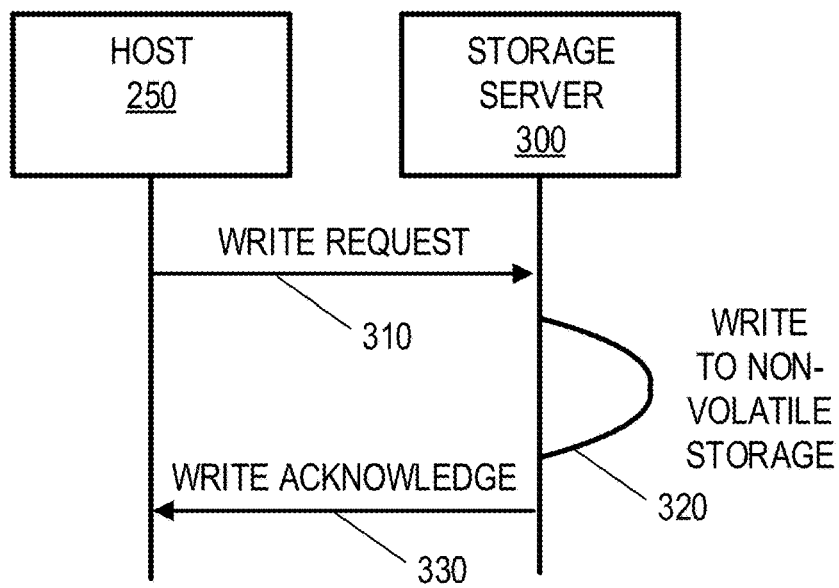
FIG. 3A is a flowchart of a method for performing a write operation in a prior art storage server that does not include persistent memory.
Figure 3B:
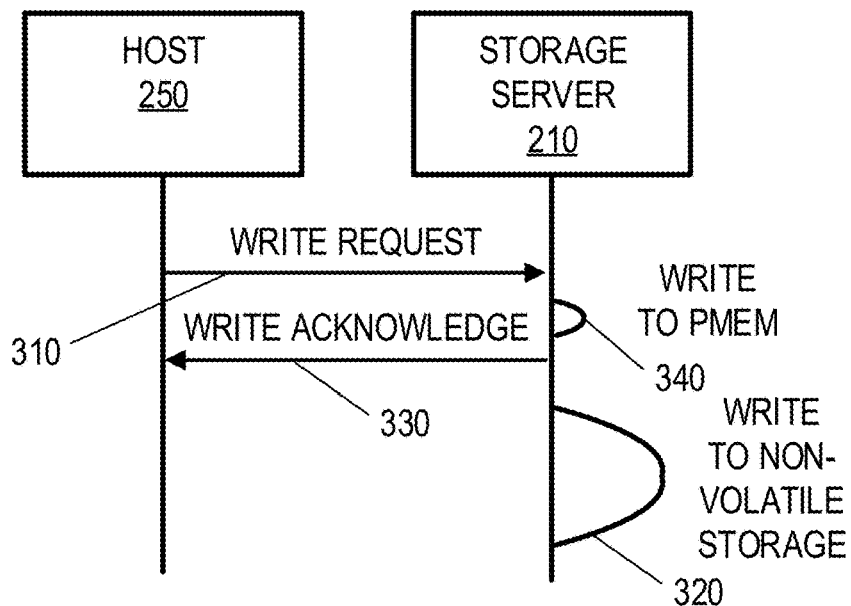
FIG. 3B is a flowchart of a method for performing a write operation in a storage server that includes a persistent memory and has enough free space in its persistent memory to store the data included in the write request, according to embodiments of the invention.
Figure 3C:
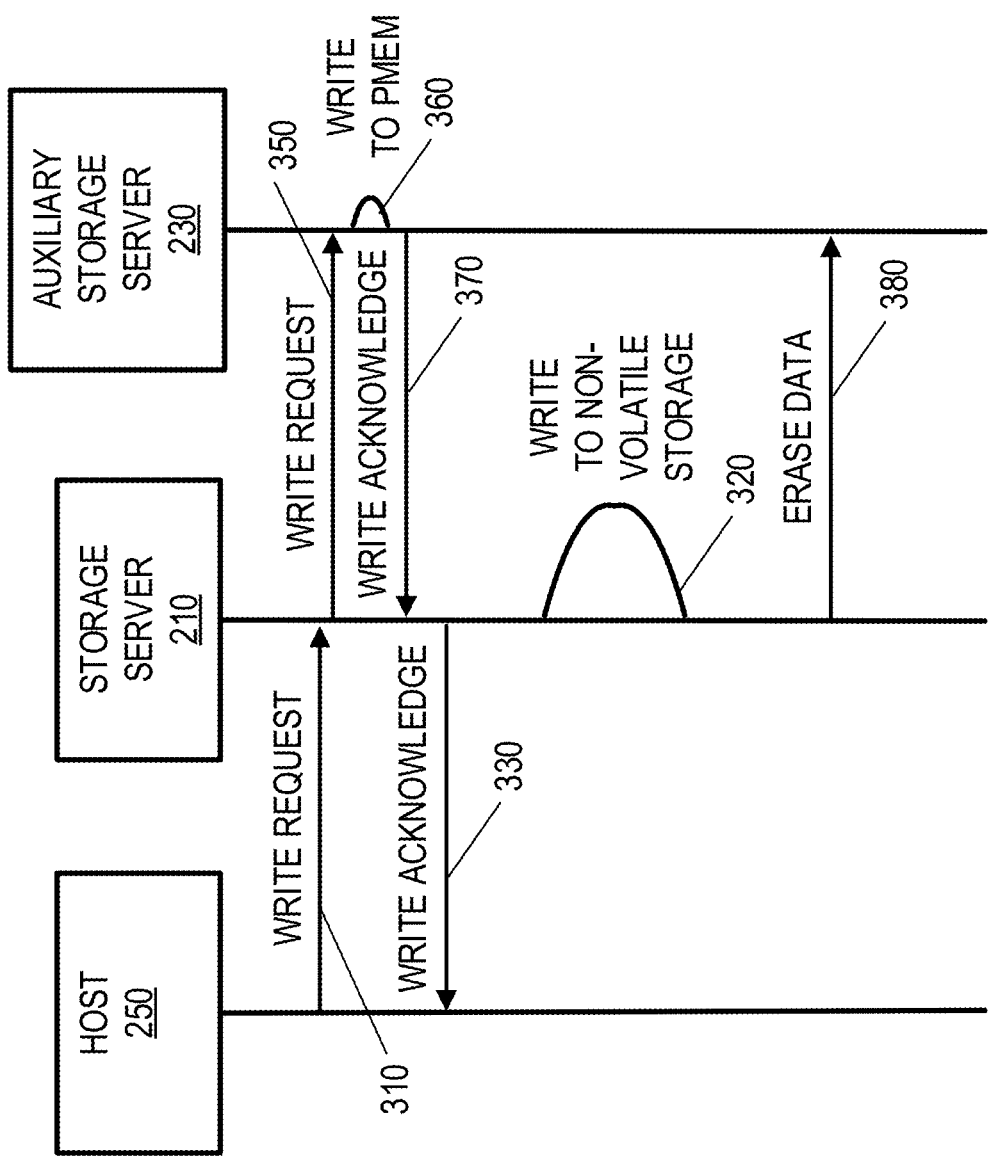
FIG. 3C is a flowchart of a method for performing a write operation in a storage server that does not include persistent memory, or does not have enough free space in its persistent memory to store the data included in the write request, according to embodiments of the invention.

Reference is made to FIG. 3A, which is a flowchart of a method for performing a write operation in a prior art storage server that does not include persistent memory, to FIG. 3B, which is a flowchart of a method for performing a write operation in a storage server that includes a persistent memory and has enough free space in its persistent memory to store the data included in the write request, and to FIG. 3C, which is a flowchart of a method for performing a write operation in a storage server that does not include persistent memory, or does not have enough free space in its persistent memory to store the data included in the write request, according to embodiments of the invention. Embodiments of methods for performing a write operation in a storage server may be performed, for example, by the system shown in FIGS. 1 and 2, or alternatively by another system.

As can be seen in FIG. 3A, host 250 may send a write request 310 to prior art storage server 300. Prior art storage server 300 may not include persistent memory, or may include a persistent memory, but the persistent memory of prior art storage server 300 may not have enough free space to store the data included in write request 310. Thus, prior art storage server 300 may store 320 the data included in write request 310 in the non-volatile storage of storage server 300. Storage server 300 may acknowledge 330 the write request to host 250 only after the entire data included in write request 310 is stored in the non-volatile storage of storage server 300. In this series of operations, the operation that takes considerably more time than others is writing the data into the non-volatile storage. Thus, the time from obtaining the write request 310 to acknowledging 330 the write request 310, also referred to as the write latency of storage server 300 is manly affected by the latency of writing the data into non-volatile storage.

In FIG. 3B, storage server 210 includes a local persistent memory component 214, and local persistent memory 214 has enough free space to store the data included in write request 310. Therefore, storage server 210 may store 340 the data included in write request 310 in persistent memory 214 and acknowledge 330 the write request to host 250 after the entire data included in write request 310 is stored in the local persistent memory 214 of storage server 210. Since storing 340 data in the local persistent memory 214 is much faster than storing 320 data in local non-volatile storage 216 of storage server 210, the time from obtaining the write request 310 to acknowledging 330 the write request 310, also referred to as the write latency of storage server 210 is much shorter comparing to the write latency of storage server 300. Eventually, storage server 210 may store 320 the data included in write request 310 in non-volatile storage 216 of storage server 210 (e.g., a copy of the user data may be stored in the volatile memory of the storage server and copied to non-volatile storage), however this may be performed concurrently and/or after acknowledging 330 the write request 310 and thus may not affect the write latency of storage server 210. After storing 320 the data included in write request 310 in non-volatile storage 216 of storage server 210, storage server 210 may delete the data included in write request 310 from local persistent memory 214.

In FIG. 3C, storage server 210 may have a local persistent memory component 214, however local persistent memory 214 may not have enough free space to store the data included in write request 310, or storage server 210 may not include a persistent memory component 214 at all. According to embodiments of the invention, storage server 210 may store the data included in write request 310 in persistent memory 234 of an auxiliary storage server 230. For example, storage server 210 may send or forward the write request 350 to auxiliary storage server 230. Auxiliary storage server 230 may store 360 the data included in write requests 350 in the local persistent memory 234 of auxiliary storage server 230, and may acknowledge 370 the write request to storage server 210, which may acknowledge 330 the write request to host 250. Since storing 360 data in the local persistent memory 234 of auxiliary storage server 230, including communication times, is much faster than storing 320 data in local non-volatile storage 216 of storage server 210, the time from obtaining the write request 310 to acknowledging 330 the write request 310, also referred to as the write latency of storage server 210 is much shorter comparing to the write latency of storage server 300, even if storage server 210 does not have an available local persistent memory. Eventually, storage server 210 may store 320 the data included in write request 310 in non-volatile storage 216 of storage server 210, however this may be performed concurrently and/or after acknowledging 330 the write request 310 and thus may not affect the write latency of storage server 210. According to some embodiments of the invention, storage server 210 may erase 380 the data associated with the write request from persistent memory 234 of auxiliary storage server 230, after storing 320 the data included in write request 310 in non-volatile storage 216 of storage server 210.

Figure 3D:
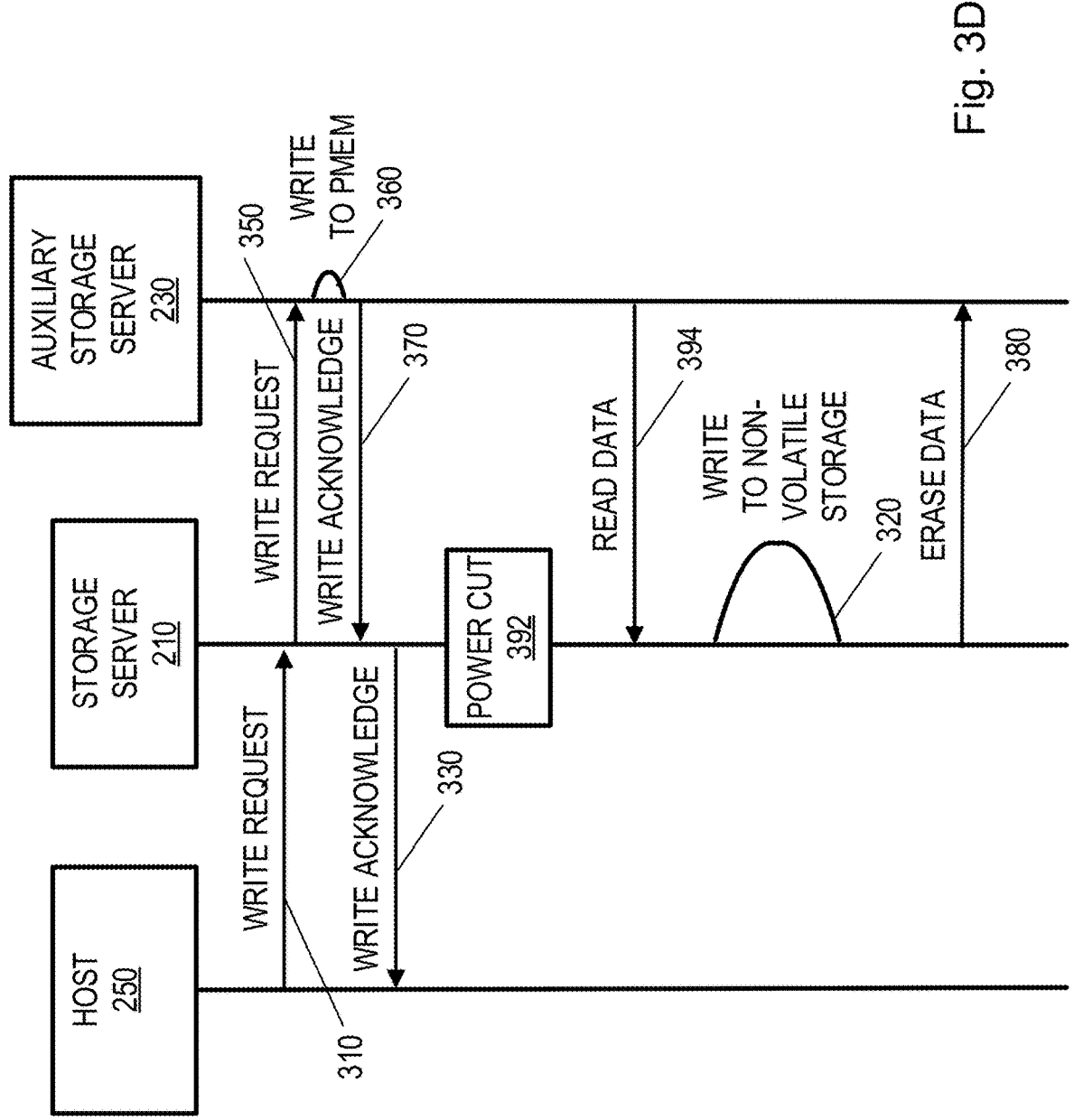
FIG. 3D is a flowchart of a method for performing data recovery from the persistent memory of the auxiliary storage server, according to embodiments of the invention.

In the Example presented in FIG. 3D, storage server 210 stores the data included in write request 310 in persistent memory 234 of an auxiliary storage server 230, similarly to FIG. 3C. At some point, after the user data is stored in persistent memory 234, and before the data is stored in non-volatile storage 216 a power cut in storage server 210 occurs. In case of a power cut, the copy of the user data that is stored in the volatile memory of storage server 210 (e.g., memory 720) may be lost. Thus, storage server 210 may recover or restore the user data by reading 394 the user data from local persistent memory 234 of auxiliary storage server 230.

Figure 4:
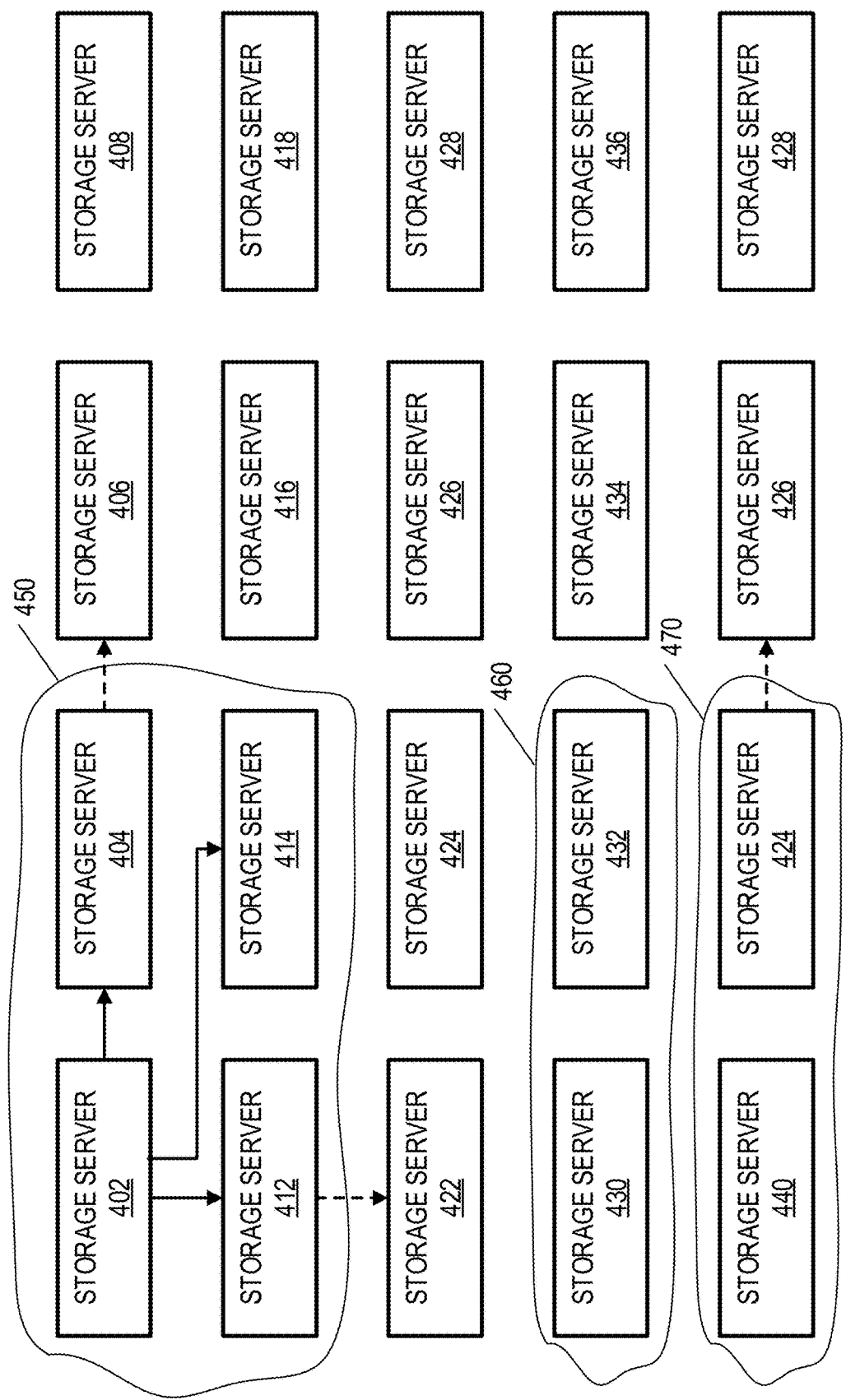
FIG. 4 is schematic illustration of a second storage cluster, according to embodiments of the invention.

Reference is made to FIG. 4, which is schematic illustration of a storage cluster 400, according to embodiments of the invention. According to embodiments of the invention, cluster 400 may include multiple storage servers 402-428 working in collaboration and interconnected, e.g., by network 240. A host (such as host 250) may access one or more of storage servers 402-428 e.g., through network 240. As known, replica sets may be defined in storage cluster 400. For example, a replica set 450 may be defined in storage cluster 400. A replica set may include a plurality of storage servers, including a primary storage server and a subset of the other storage server referred to as secondary storage servers. For example, replica set 450 may include storage servers 402, 404, 412 and 414, where storage server 402 is the primary storage server and storage servers 404, 412 and 414 are the secondary storage servers. Other replica sets may be defined in storage cluster 400 for the same or other hosts. A single storage server of storage servers 402-428 may be a primary storage server in one replica set, a secondary storage server in a second replica set and not a member in a third replica set.

According to some embodiments, some or all of storage servers 402-428 may include a persistent memory that may be used for implementing a write buffer. Primary storage server 402 in replica set 450 may receive a write request from host 250 and issue a replication request to secondary storage servers 404, 412 and 414, asking them to replicate, e.g., store copies of, the user data. To protect the user data from server failure, primary storage server 402 may only acknowledge the write request to host 250 after primary storage server 402 has stored the data and all of the secondary storage servers 404, 412 and 414 have acknowledged the replication request to primary storage server 402, e.g., after the data has been stored on each of primary storage server 402 and secondary storage servers 404, 412 and 414 in the replica set. According to embodiments of the invention, primary storage server 402 may store the user data in a persistent memory, either the persistent memory of the primary storage server 402 itself, or in a persistent memory of an auxiliary storage server, as disclosed herein. Similarly, each of the secondary storage servers 404, 412 and 414 may acknowledged the replication request to primary storage server 402 after storing the data included in the write request in a persistent memory, either the persistent memory of the secondary storage server 404, 412 and 414 itself, or in a persistent memory of an auxiliary storage server, as disclosed herein.

For example, primary storage server 402 in replica set 450 may receive a write request from host 250 and issue a replication request to each of secondary storage servers 404, 412 and 414, asking each of them to store data included in the write request. In the present example, storage server 414 includes persistent memory, and the persistent memory of storage server 414 has enough free space to store the data included in the write request. Therefore, storage server 414 may store the data included in the write request in its persistent memory and acknowledge the replication request to primary storage server 402. Storage server 404, does not include a persistent memory. Therefore, storage server 404 may store the data included in the write request in a persistent memory of an auxiliary storage server, e.g., storage server 406. Storage server 412, include a persistent memory, however, the persistent memory of storage server 412 does not have enough free space to store the data included in the write request. Therefore, storage server 412 may store the data included in the write request in a persistent memory of an auxiliary storage server, e.g., storage server 422.

It is noted that typically, the auxiliary storage servers available for or used by storage servers 402, 404, 412 and 414 of replica set 450, are not included in the replica set 450. Otherwise, a single storage server may store two replicas of the data which will reduce the redundancy provided by the replica set. In addition, if a storage server is used as an auxiliary storage server for one storage server in the replica set, the same storage server may not be used as an auxiliary storage server for another storage server in the replica set, for the same reason. For example, storage server 406 that is used as an auxiliary storage server for storage server 404, may not be used as an auxiliary storage server for storage server 422.

Cluster 400 includes two other example replica sets 460 and 470. Replica set 460 includes primary storage server 430 and secondary storage server 432, both having an available persistent memory. Replica set 470 includes primary storage server 440 and secondary storage server 442, where primary storage server 440 includes available persistent memory and secondary storage server 442 does not have an available persistent memory. Examples of storing data in prior art replica set, as well as in replica sets 460 and 470 will be described with reference to FIGS. 5A, 5B and 5C, respectively. These examples are provided for demonstration purposes and are not limiting. Similar principles may be used for other, possibly larger, replica sets, as disclosed herein.

Figure 5A:
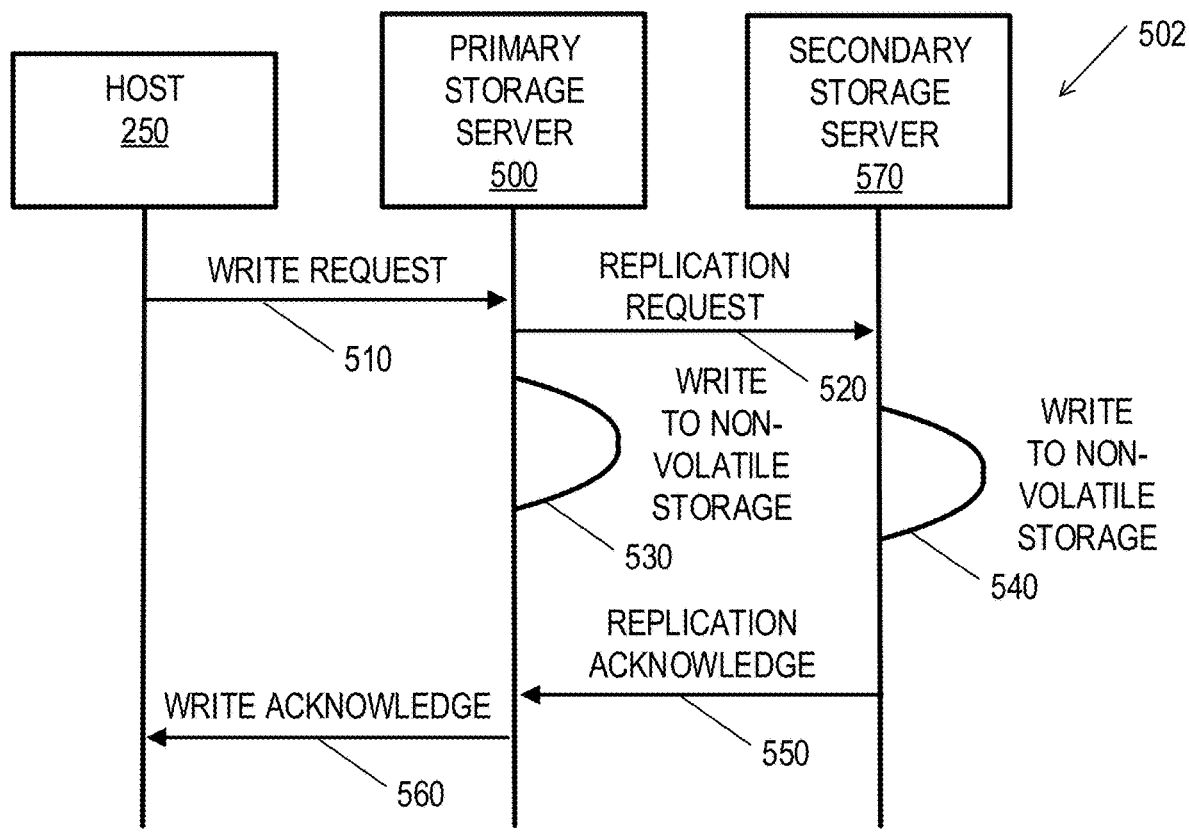
FIG. 5A is a flowchart of a method for performing a write operation with replications in a prior art replica set in which all storage servers do not include persistent memory.
Figure 5B:
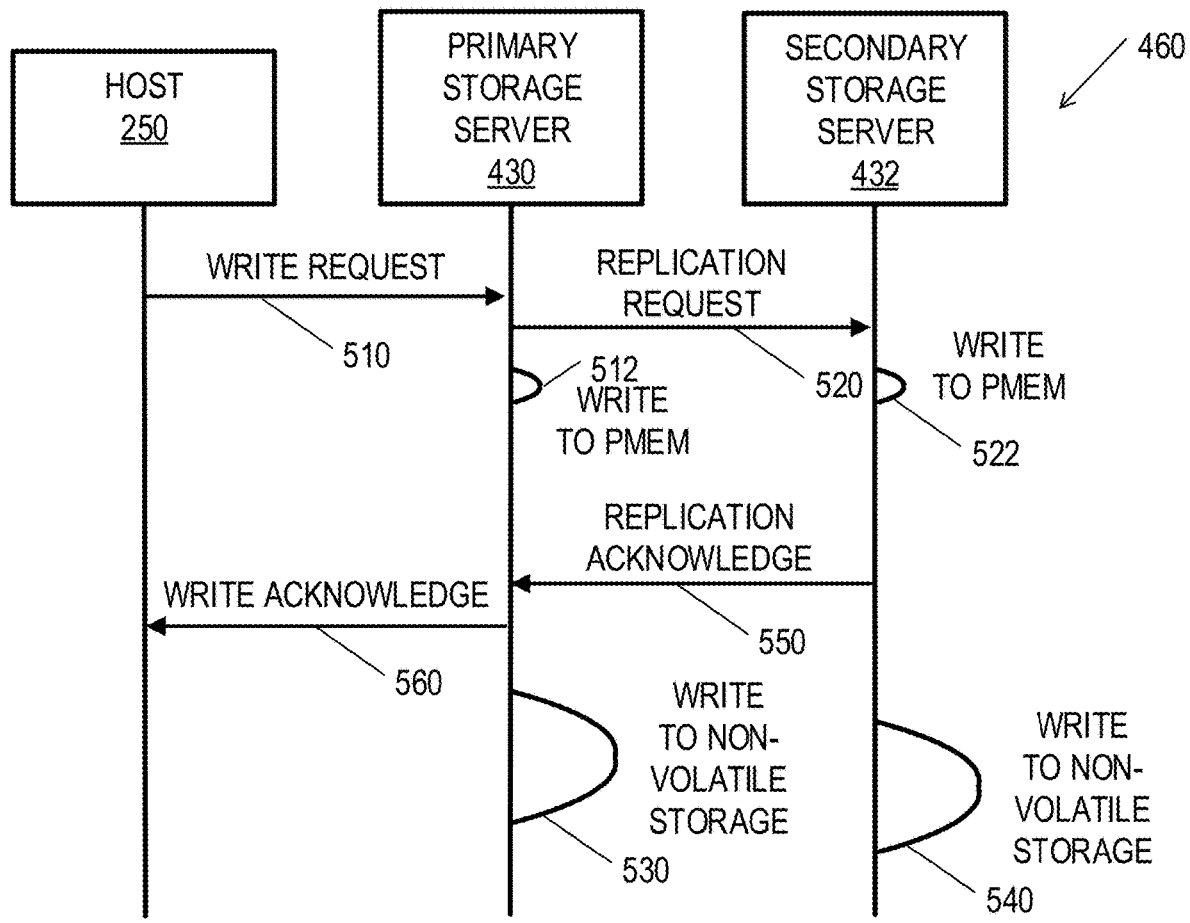
FIG. 5B is a flowchart of a method for performing a write operation with replication in replica set, according to embodiments of the invention.
Figure 5C:
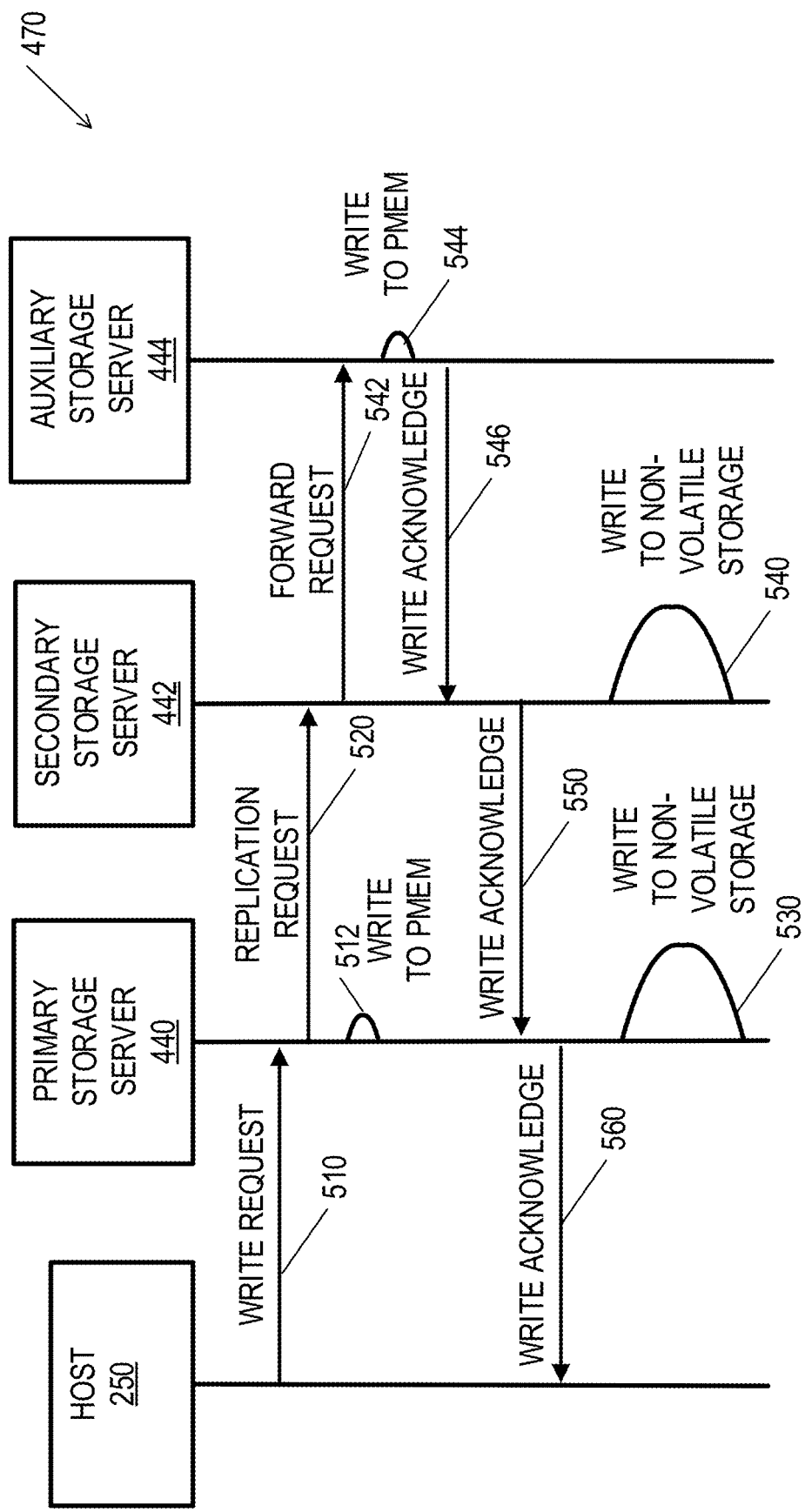
FIG. 5C is a flowchart of a method for performing a write operation with a replication in replica set, according to embodiments of the invention.

Reference is made to FIG. 5A, which is a flowchart of a method for performing a write operation with replications in a prior art replica set 502 in which all storage servers do not include persistent memory, to FIG. 5B, which is a flowchart of a method for performing a write operation with replication in replica set 460, and to FIG. 5C, which is a flowchart of a method for performing a write operation with a replication in replica set 470, according to embodiments of the invention. An embodiment of a method for performing a write operation in a storage server with replica sets may be performed, for example, by the system shown in FIGS. 1, 2 and 4, or alternatively by another system.

As can be seen in FIG. 5A, host 250 may send a write request 510 to storage server 500. Storage server 500 may be the primary storage server 500 in a prior art replica set 502 including primary storage server 500 and secondary storage server 570, both not having available persistent memory. Primary storage server 500 may not include persistent memory, or may include a persistent memory, but the persistent memory of prior art storage server 500 may not have enough free space to store the data included in write request 510. Thus, primary storage server 500 may store 530 the data included in write request 510 in the non-volatile storage of storage server 500. In addition, storage server 500 may issue a replication request 520 to secondary storage server 570. Secondary storage server 570 may not include persistent memory, or may include a persistent memory, but the persistent memory of prior art secondary storage server 570 may not have enough free space to store the data included in replication request 520 (which is the same user data included in write request 510). Thus, secondary storage server 570 may store 540 the data included in replication request 520 in the non-volatile storage of secondary storage server 570. Secondary storage server 570 may acknowledge 550 the replication request to primary storage server 500 after completing writing the data included in replication request 520 in the non-volatile storage of secondary storage server 570.

Storage server 500 may acknowledge 560 the write request to host 250 only after the entire data included in write request 510 is stored in the non-volatile storage of primary storage server 500 and in the non-volatile storage of secondary storage server 570. In this series of operations, the operations that take considerably more time than others are writing the data into non-volatile memories. Thus, the time from obtaining the write request 510 to acknowledging 560 the write request 510, also referred to as the write latency of the replica set 502 is mainly affected by the latency of writing the data into the non-volatile storage modules.

In FIG. 5B, primary storage server 430 includes a local persistent memory, and the local persistent memory of primary storage server 430 has enough free space to store the data included in write request 510. Therefore, primary storage server 430 may store 512 the data included in write request 510 in local persistent memory of primary storage server 430. Similarly, secondary storage server 432 includes a local persistent memory, and the local persistent memory of secondary storage server 432 has enough free space to store the data included in replication request 520. Therefore, secondary storage server 432 may store 522 the data included in replication request 520 in the local persistent memory of secondary storage server 432. Secondary storage server 570 may acknowledge 550 the replication request to primary storage server 500 after completing writing 522 the data included in replication request 520 in the local persistent memory of secondary storage server 430, and before completing writing 540 the data included in replication request 520 in non-volatile storage of secondary storage server 570.

Primary storage server 430 may acknowledge 560 the write request to host 250 after the entire data included in write request 510 is stored in the local persistent memory of primary storage server 430 and in the local persistent memory of secondary storage server 432. Since storing 512, 522 data in the local persistent memory of both servers 430 and 432, respectively, is much faster than storing 530, 540 data in local non-volatile storage of both servers 430 and 432, respectively, the time from obtaining the write request 510 to acknowledging 560 the write request 510, also referred to as the write latency of the replica set 460 is much shorter comparing with the write latency of prior art replica set 502. Eventually, primary storage server 430 may store 530 the data included in write request 510 in the non-volatile storage of primary storage server 430, and secondary storage server 432 may store 540 the data included in write request 510 in the non-volatile storage of secondary storage server 432, however this may be performed concurrently and/or after acknowledging 560 the write request 510 and thus may not affect the write latency of replica set 460. Primary storage server 430 may delete the data included in write request 510 from its persistent memory after storing 530 the data included in write request 510 in the non-volatile storage of primary storage server 430, and secondary storage server 432 may delete the data included in write request 510 from its persistent memory after storing 540 the data included in write request 510 in the non-volatile storage of secondary storage server 432.

In FIG. 5C, primary storage server 440 may have an available local persistent memory, however secondary storage server 442 may not have an available local persistent memory. Thus, according to embodiments of the invention, secondary storage server 442 may store the data included in replication request 520 in a persistent memory of an auxiliary storage server 444. For example, secondary storage server 442 may send or forward 542 the replication request 520 to auxiliary storage server 444. Auxiliary storage server 444 may store 544 the data included in forward request 542 (the user data) in the local persistent memory of auxiliary storage server 444 and may acknowledge 546 the write request to secondary storage server 442, which may acknowledge 550 the write request to primary storage server 440, which in turn may acknowledge 560 the write request to host 250. Since storing 544 data in the local persistent memory of auxiliary storage server 444, including communication times, is much faster than storing 540 data in local non-volatile storage of secondary storage server 442, the time from obtaining the write request 510 to acknowledging 560 the write request 510, also referred to as the write latency of replica set 470 is much shorter comparing to the write latency of replica set 500, even if secondary storage server 442 does not have an available local persistent memory. Eventually, primary storage server 440 may store 530 the data included in write request 510 in the non-volatile storage of primary storage server 440, and secondary storage server 442 may store 540 the data included in write request 510 in the non-volatile storage of secondary storage server 442. However, this may be performed concurrently and/or after acknowledging 560 the write request 510 and thus may not affect the write latency of replica set 470. Primary storage server 430 may delete the data included in write request 510 from its persistent memory after storing 530 the data included in write request 510 in the non-volatile storage of primary storage server 430, and secondary storage server 432 may delete the data included in write request 510 from the persistent memory of auxiliary storage server 444 after storing 540 the data included in write request 510 in the non-volatile storage of secondary storage server 432.

Figure 6:
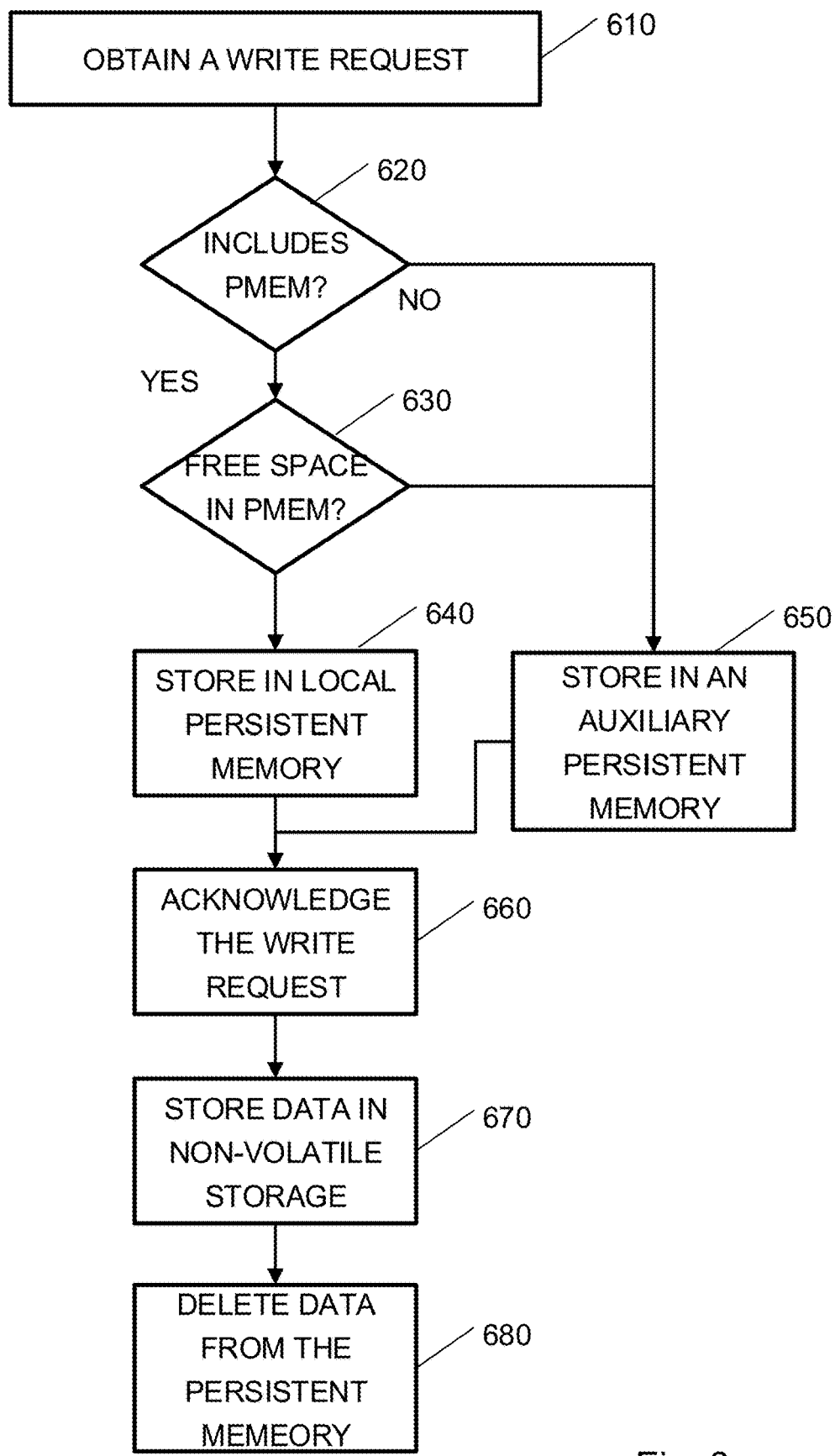
FIG. 6 is a flowchart of a method for providing a distributed write buffer, according to embodiments of the invention.

Reference is made to FIG. 6, which is a flowchart of a method for providing a distributed write buffer, according to embodiments of the invention. An embodiment of a method for providing a distributed write buffer may be performed, for example, by the systems shown in FIGS. 1, 2 and 4, or alternatively by another system.

In operation 610, a write request may be obtained, e.g., by a primary storage server. The write request may include data, referred to herein as user data. According to embodiments of the invention, the data associated with the write request may be stored in a persistent memory of the primary storage server or in a persistent memory of an auxiliary storage server (e.g., another, separate storage server) based on presence of persistent memory space in the primary storage server. For example, in operation 620 it may be determined (e.g., by a processor of the primary storage server) if the primary storage server includes persistent memory (also referred to as the local persistent memory). If the primary storage server includes a local persistent memory, then in operation 630 it may be determined (e.g., by a processor of the primary storage server) if the local persistent memory of primary storage server has enough free storage space to store the data included in the write request (also referred to as user data). If the local persistent memory has enough free storage space to store the user data, then in operation 640 the user data may be stored in the local persistent memory. If, however, the primary storage server does not have available local persistent memory, e.g., if the primary storage server does not include a local persistent memory at all or if the primary storage server does include a local persistent memory, but the local persistent memory does not have enough free storage space to store the user data, then in operation 650, the user data may be stored in a persistent memory of a separate or auxiliary storage server.

In operation 660, the write request may be acknowledged by the primary storage server. According to embodiments of the invention, acknowledging the write request may be performed after storing the user data in a persistent memory (either local or auxiliary) and before or concurrently with storing the data into the non-volatile storage of the primary storage server.

In operation 670, the user data may be written not the non-volatile storage of the primary storage server. For example, the user data may be temporarily stored in saved in the volatile memory of the primary storage server (e.g., memory 720) and written from there to the non-volatile storage of the primary storage server. Once the user data is stored in the non-volatile storage of the primary storage server, the user data may be erased or deleted 680 from the persistent memory where it was previously stored, e.g., either the local or the auxiliary persistent memory.

Figure 7:
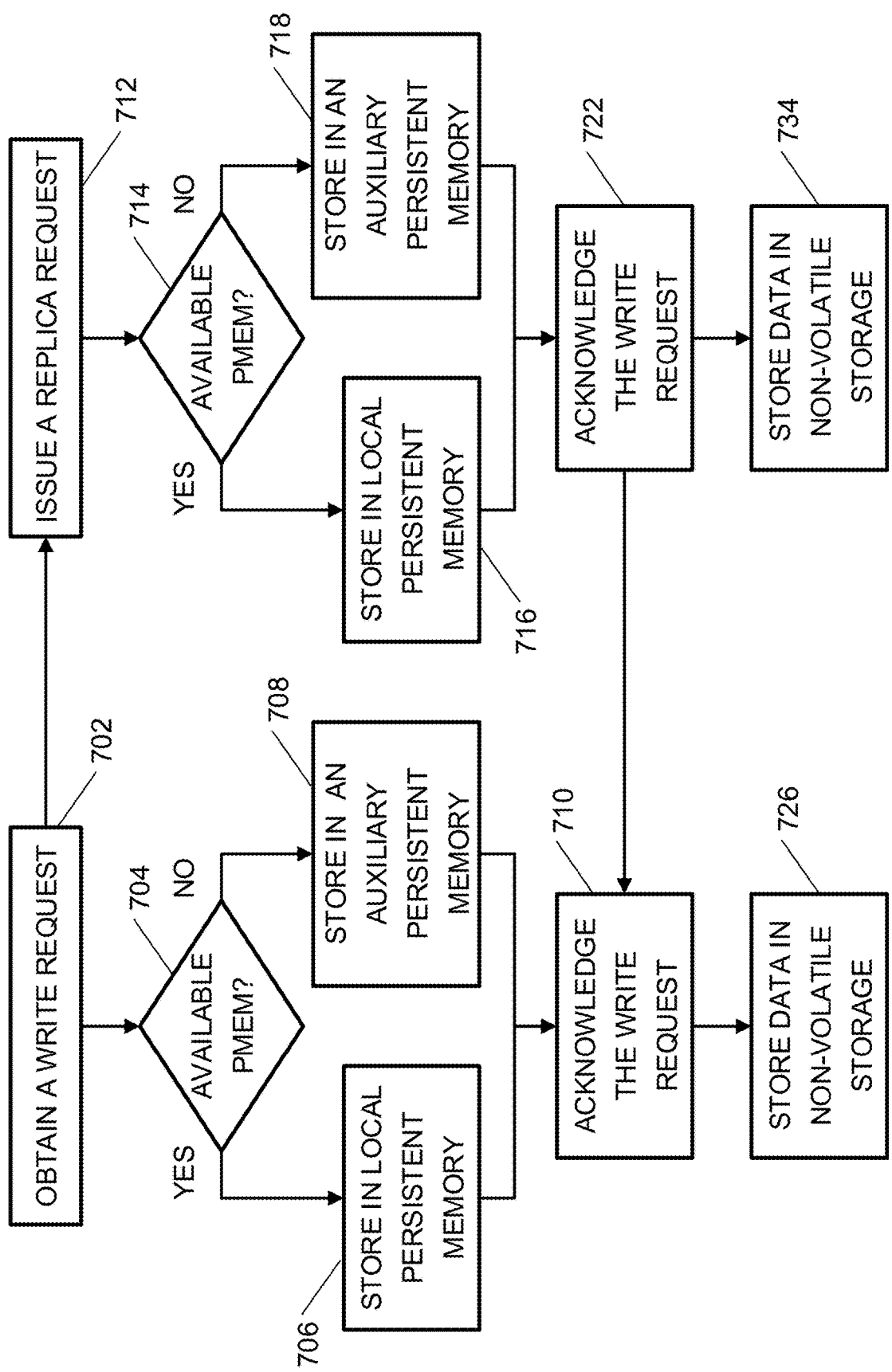
FIG. 7 is a flowchart of a method for providing a distributed write buffer in a replica set, according to embodiments of the invention.

Reference is made to FIG. 7, which is a flowchart of a method for providing a distributed write buffer in a replica set, according to embodiments of the invention. An embodiment of a method for providing a distributed write buffer in a replica set may be performed, for example, by the systems shown in FIGS. 1, 2 and 4, or alternatively by another system.

In operation 702, a write request may be obtained by a processor (e.g., processor 705), of a primary storage server. According to embodiments of the invention, the data associated with the write request may be stored in a persistent memory of the primary storage server or in a persistent memory of an auxiliary storage server based on presence or availability of persistent memory space in the primary storage server. For example, in operation 704 the processor may determine whether the primary storage server has available persistent memory space. For example, if the primary storage server does not include a persistent memory at all, or if the primary storage server includes a persistent memory, but the persistent memory of the primary storage server does not have enough free space to store the user data, then it may be determined that the primary storage server does not have available persistent memory space. Otherwise, it may be determined that the primary storage server has available persistent memory space. If the primary storage server has available persistent memory space, then in operation 706, the user data may be stored in the local persistent memory of the primary storage server. If, however, the primary storage server does not have available persistent memory space, then in operation 708, the user data may be stored in a persistent memory of an auxiliary storage server (e.g., in an auxiliary persistent memory).

In operation 712, the processor of the primary storage server may issue a replica request to one or more secondary storage servers, to store a replica of the user data. The data associated with the write request may be stored in a persistent memory of each of the secondary storage servers or in a persistent memory of a unique auxiliary storage server that is associated with the secondary storage server (e.g., another, separate storage server, unique to the specific secondary storage server) based on presence or availability of persistent memory space in the secondary storage server. Thus, operations 714-724 may be performed by each of the secondary storage servers. For example, in operation 714 the processor of a secondary storage server may determine whether the secondary storage server has available persistent memory space. For example, if the secondary storage server does not include a persistent memory at all, or if the secondary storage server includes a persistent memory, but the persistent memory of the secondary storage server does not have enough free space to store the user data, then it may be determined that the secondary storage server does not have available persistent memory space. Otherwise, it may be determined that the secondary storage server has available persistent memory space. If the secondary storage server has available persistent memory space, then in operation 716, the user data may be stored in the local persistent memory of the secondary storage server. If, however, the secondary storage server does not have available persistent memory space, then in operation 718, the user data may be stored in a persistent memory of an auxiliary or separate storage server (e.g., in an auxiliary persistent memory). According to some embodiments, each storage server in a replica set may be associated with a unique auxiliary storage server, to prevent using the same storage server as an auxiliary storage server by two storage servers in a replica set. Other methods may be used to prevent two storage servers in a replica set from using the same storage server as an auxiliary storage server. In operation 722, the secondary storage server may acknowledge the primary storage server that the user data is stored in the persistent memory (either local or auxiliary). In operation 710, after obtaining acknowledgments from all the secondary storage servers in the replica set, and after storing the user data in a persistent memory, the primary storage server may acknowledge the write request to the host. In operation 726, primary storage server may store the user data in its local non-volatile storage (e.g., copy the user data from the volatile memory of the primary storage server), and in operation 734, each secondary storage server may store the user data in its local non-volatile storage (e.g., copy the user data from the volatile memory of the secondary storage server). After writing the user data to the local non-volatile storage, each storage server may delete the user data from the persistent memory, either the local or the auxiliary.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for providing a distributed write buffer in a storage system, the method comprising:
   obtaining a write request at a primary storage server to store data associated with the write request in a non-volatile storage of the primary storage server;
   storing the data associated with the write request in a persistent memory of the primary storage server or in a persistent memory of an auxiliary storage server based on presence of persistent memory space in the primary storage server;
   issuing, by the primary storage server, a replication request to a secondary storage server;
   storing the data associated with the write request in a persistent memory of the secondary storage server or in a persistent memory of a third storage server based on presence of persistent memory space in the secondary storage server;
   acknowledging the replication request by the secondary storage server to the primary storage server after storing the data associated with the write request in the persistent memory of the third storage server; and
   acknowledging the write request by the primary storage server after receiving the acknowledgement from the secondary storage server, and after storing the data associated with the write request in the persistent memory of the auxiliary storage server.

2. The method of claim 1, comprising:
   acknowledging, by the primary storage server, the write request after storing the data associated with the write request in the persistent memory of the primary storage server or in the persistent memory of the auxiliary storage server.

3. The method of claim 1, comprising:
   storing, by the primary storage server, the data associated with the write request in the non-volatile storage of the primary storage server.

4. The method of claim 3, comprising:
   erasing, by the primary storage server, the data associated with the write request from the persistent memory of the auxiliary storage server after storing the data associated with the write request in the non-volatile storage of the primary storage server.

5. The method of claim 1, wherein the access time of the persistent memory is faster than the access time of the non-volatile storage by at least an order of magnitude.

6. The method of claim 1, wherein storing the data associated with the write request in a persistent memory of the auxiliary storage server comprises:
   sending, by the primary storage server, the data associated with the write request to the auxiliary storage server; and
   storing, by the auxiliary storage server, the data associated with the write request in the persistent memory of the auxiliary storage server.

7. A method for providing a distributed write buffer in a storage system, the method comprising:
   obtaining a write request at a primary storage server to store data associated with the write request in a non-volatile storage of the primary storage server;
   storing the data associated with the write request in a persistent memory of the primary storage server or in a persistent memory of an auxiliary storage server based on presence of persistent memory space in the primary storage server;
   issuing, by the primary storage server, a plurality of replication requests to a plurality of secondary storage servers;
   storing, by each of the secondary storage servers, the data associated with the write request in a persistent memory of the secondary storage server or in a persistent memory of a unique third storage server of a plurality of third storage servers, based on presence of persistent memory space in the secondary storage server;
   acknowledging the replication request by each of the secondary storage servers to the primary storage server after storing the data associated with the write request in the respective persistent memory of the respective unique auxiliary storage server; and
   acknowledging the write request by the primary storage server after receiving the acknowledgements from each of the secondary storage servers, and after storing the data associated with the write request in the persistent memory of the third storage server.

8. A distributed storage system, comprising:
   a secondary storage server comprising a secondary processor;
   a third storage server comprising a persistent memory of the third storage server;
   an auxiliary storage server comprising a persistent memory; and
   a primary storage server comprising:
      a memory;
      a non-volatile storage; and
      a primary processor configured to:
         obtain a write request to store data associated with the write request in the non-volatile storage;
         store the data associated with the write request in a persistent memory of the primary storage server or in the persistent memory of the auxiliary storage server based on presence of persistent memory space in the primary storage server; and
         issue a replication request to the secondary storage server;
      wherein the secondary processor is configured to:
         store the data associated with the write request in a persistent memory of the secondary storage server or in the persistent memory of the third storage server based on presence of persistent memory space in the secondary storage server; and
         acknowledge the replication request to the primary storage server after storing the data associated with the write request in the persistent memory of the third storage server; and
      wherein the primary processor is configured to:
         acknowledge the write request after receiving the acknowledgement from the secondary storage server, and after storing the data associated with the write request in the persistent memory of the auxiliary storage server.

9. The system of claim 8, wherein the primary processor is configured to:

acknowledge the write request after storing the data associated with the write request in the persistent memory of the auxiliary storage server.

10. The system of claim 8, wherein the primary processor is configured to:
   store the data associated with the write request in the non-volatile storage of the primary storage server.

11. The system of claim 10, wherein the primary processor is configured to:
   erase the data associated with the write request from the persistent memory of the auxiliary storage server after storing the data associated with the write request in the non-volatile storage of the primary storage server.

12. The system of claim 8, comprising:
   a plurality of secondary storage server, each comprising a respective secondary processor;
   a plurality of third storage servers, each comprising a respective persistent memory,
   wherein the primary processor is configured to:
      issue a plurality of replication requests to the plurality of secondary storage servers; and
   wherein each of the secondary processors is configured to:
      store the data associated with the write request in a persistent memory of the secondary storage server or in a persistent memory of a unique third storage server of the plurality of third storage servers, based on presence of persistent memory space in the secondary storage server.

13. The system of claim 12, wherein each of the secondary processors is configured to:
   acknowledge the replication request to the primary storage server after storing the data associated with the write request in the respective persistent memory of the respective unique third storage server; and
   wherein the primary processor is configured to:
      acknowledge the write request after receiving the acknowledgements from each of the secondary storage servers, and after storing the data associated with the write request in the persistent memory of the auxiliary storage server.

14. The system of claim 8, wherein the access time of the persistent memory is faster than the access time of the non-volatile storage by at least an order of magnitude.

15. The system of claim 8, wherein the primary processor is configured to store the data associated with the write request in the persistent memory of the auxiliary storage server by:
   sending the data associated with the write request to the storage server; and
   wherein the auxiliary storage server is configured to store the data associated with the write request in the persistent memory of the auxiliary storage server.

* * * * *